United States Patent [19]

Hoge

[11] Patent Number: 4,885,217
[45] Date of Patent: Dec. 5, 1989

[54] AIR CATHODES AND MATERIALS THEREFOR

[75] Inventor: William H. Hoge, Flemington, N.J.

[73] Assignee: Alupower, Inc., Bernardsville, N.J.

[21] Appl. No.: 70,183

[22] Filed: Jul. 6, 1987

[51] Int. Cl.⁴ .......................... H01M 4/86; H01M 4/88
[52] U.S. Cl. .......................................... 429/27; 502/101
[58] Field of Search .................... 429/27, 42; 156/279; 29/623.1; 502/101

[56] References Cited

U.S. PATENT DOCUMENTS

| | | |
|---|---|---|
| 3,600,230 | 8/1971 | Stachurski et al. .................... 429/27 |
| 3,930,094 | 12/1975 | Sampson et al. ...................... 429/42 |
| 4,017,663 | 4/1977 | Breault ................................ 429/42 |
| 4,448,856 | 5/1984 | Zuckerbrod et al. ................ 429/27 |
| 4,477,539 | 10/1984 | Struthers ............................. 429/27 |
| 4,514,474 | 4/1985 | Momyer et al. ..................... 429/27 |
| 4,626,482 | 12/1986 | Hamlen et al. ...................... 429/27 |

FOREIGN PATENT DOCUMENTS

| | | | |
|---|---|---|---|
| 0058639 | 5/1978 | Japan .................................. | 429/42 |
| 0165254 | 9/1983 | Japan .................................. | 429/42 |

*Primary Examiner*—Donald L. Walton
*Attorney, Agent, or Firm*—Cooper & Dunham

[57] ABSTRACT

A sheetlike laminated air cathode including first and second layers having opposed major surfaces respectively exposed for contact with a liquid electrolyte and with air, the layers also having facing major surfaces, and the second layer being permeable to air but not to the liquid electrolyte; and a current collector in contact with the first layer and connectable to external electrical circuitry. The first layer is a nonwoven fibrous web impregnated with a mixture of carbon particles and a nonfibrous polymeric substance for holding the carbon particles in the web. The facing major surfaces of the first and second layers are bonded together by heat seal coating material distributed on those major surfaces in such manner as to provide an array or network of areas free of coating material extending substantially uniformly thereover.

9 Claims, 1 Drawing Sheet

U.S. Patent  Dec. 5, 1989  4,885,217
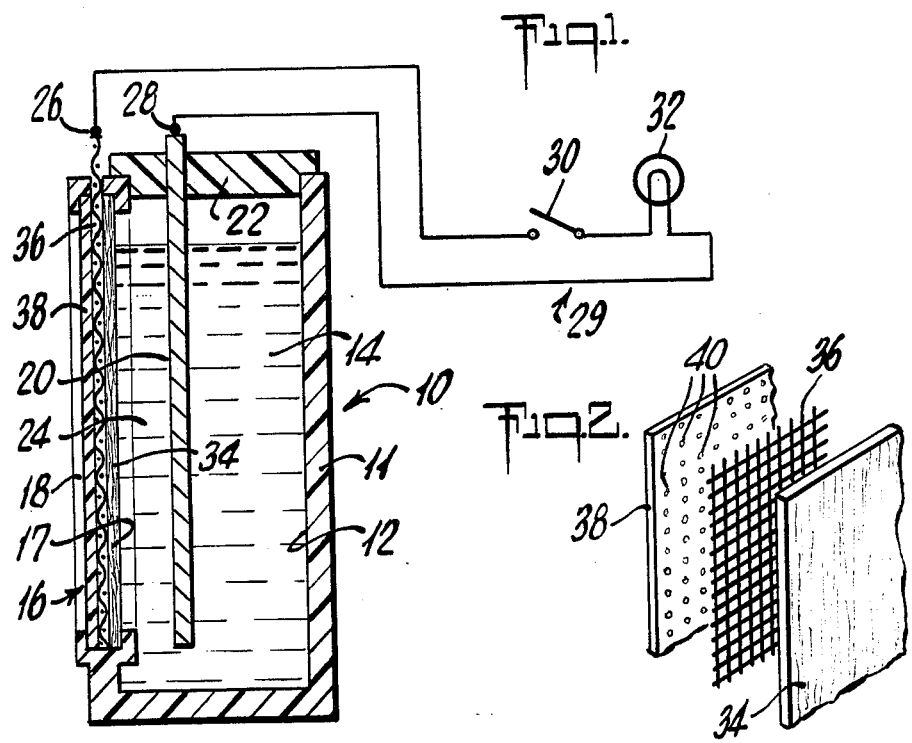
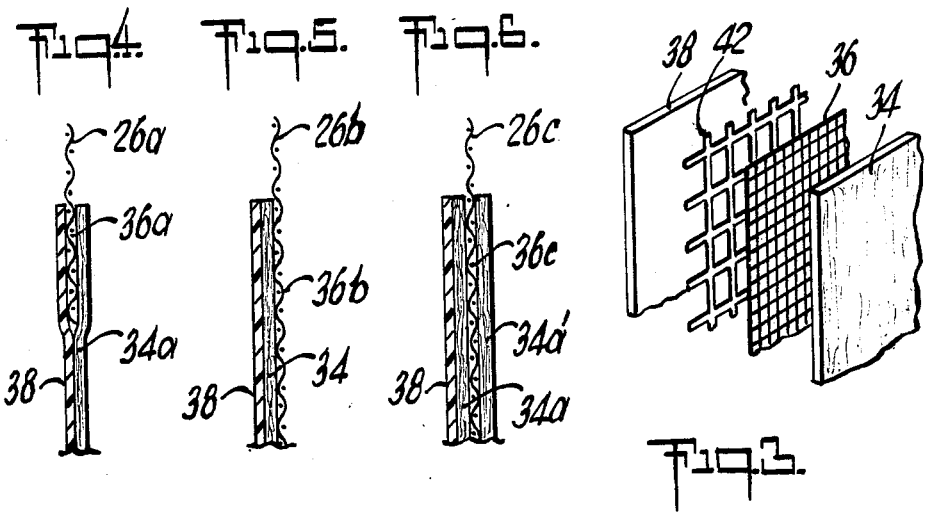

AIR CATHODES AND MATERIALS THEREFOR

BACKGROUND OF THE INVENTION

This invention relates to air cathodes suitable for use in fuel cells or metal/air batteries, and to materials having utility in such cathodes, as well as to methods of making the same. Illustratively, the invention will be described with particular reference to cathodes for metal/air batteries.

Metal/air batteries produce electricity by the electrochemical coupling of a reactive metallic anode to an air cathode through a suitable electrolyte in a cell. As is well known in the art, an air cathode is a typically sheetlike member, having opposite surfaces respectively exposed to the atmosphere and to the aqueous electrolyte of the cell, in which (during cell operation) atmospheric oxygen dissociates while metal of the anode oxidizes, providing a usable electric current flow through external circuitry connected between the anode and cathode. The air cathode must be permeable to air but substantially hydrophobic (so that aqueous electrolyte will not seep or leak through it), and must incorporate an electrically conductive element to which the external circuitry can be connected; for instance, in present-day commercial practice, the air cathode is commonly constituted of active carbon (with or without an added dissociation-promoting catalyst) containing a finely divided hydrophobic polymeric material and incorporating a metal screen as the conductive element. A variety of anode metals have been used or proposed; among them, alloys of aluminum and alloys of magnesium are considered especially advantageous for particular applications, owing to their low cost, light weight, and ability to function as anodes in metal/air batteries using neutral electrolytes such as sea water or other aqueous saline solutions.

Thus, by way of more specific example, an illustrative aluminum/air cell comprises a body of aqueous saline electrolyte, a sheetlike air cathode having one surface exposed to the electrolyte and the other surface exposed to air, and an aluminum alloy anode member (e.g. a flat plate) immersed in the electrolyte in facing spaced relation to the first-mentioned cathode surface. The discharge reaction for this cell may be written

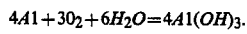

$$4Al + 3O_2 + 6H_2O = 4Al(OH)_3.$$

As the reaction proceeds, copious production of the aluminum hydroxide reaction product (initially having a gel-like consistency) in the space between anode and cathode ultimately interferes with cell operation, necessitating periodic cleaning and electrolyte replacement. Recharging of the cell is effected mechanically by replacing the aluminum anode when substantial anode metal has been consumed in the cell reaction.

Metal/air batteries have an essentially infinite shelf-storage life so long as they are not activated with electrolyte, making them very suitable for standby or emergency uses. For example, an emergency lamp or lantern can be constructed with a metal/air battery such as an aluminum/air battery, and a separate container of electrolyte can be stored with the battery, or be readily available within its intended environment of use. When a need for use of an emergency light arises, a user can merely activate the metal-air battery (by immersing the electrode in the electrolyte) and be provided with useful light.

Notwithstanding these and other potential uses and advantages of metal/air batteries, their application has been limited owing to the cost and difficulty of producing satisfactory air cathodes. For instance, it is conventional in present-day practice to produce air cathode sheet material by extruding a mixture of carbon and fluorinated polymer and pressing the mixture onto a metal mesh. The resulting material is relatively expensive; moreover, it is difficult to extrude material having the high carbon content required for air cathodes. Other problems have been encountered in achieving and maintaining satisfactory cohesion of laminated (multilayer) air cathodes.

SUMMARY OF THE INVENTION

The present invention in a first aspect broadly contemplates the provision of an air cathode comprising a sheetlike laminate that includes first and second layers having opposed major surfaces respectively exposed for contact with a liquid electrolyte and with air, these layers also having facing major surfaces, and the second layer being permeable to air but not to the liquid electrolyte; and current-collecting means in contact with the first layer and connectable to external electrical circuitry. As one particular feature of the invention, the first layer of this cathode comprises a nonwoven fibrous web impregnated with a mixture of carbon particles and a nonfibrous polymeric substance for holding the carbon particles in the web. As another particular feature of the invention, separately or in combination with the foregoing feature, the facing major surfaces of the first and second layers are bonded together by heat seal coating material distributed on those facing major surfaces in such manner as to provide an array or network of areas free of coating material extending substantially uniformly thereover.

As a still further feature of the invention, in currently preferred embodiments, the fibrous web is a nonwoven web of conductive carbon fibers.

The coating material may, for example, be distributed as a multiplicity of spaced-apart dots, or as a mesh having coating-material-free interstices. The provision of coating-free spaces maintains sufficient unclogged pores in the second layer (i.e. pores not sealed by the coating) to enable the air cathode to function as intended, yet with effective lamination of the layers to each other and/or to the current-collecting means.

In illustrative embodiments of the air cathode of the invention, the current-collecting means comprises a layer of metal mesh. For example, the layer of metal mesh may be interposed between and may be substantially coextensive in area with the first and second layers of the cathode. Alternatively, the layer of metal mesh may be bonded to the exposed surface of the first layer.

In a second aspect, the invention embraces sheet material having utility as an electrolyte-contacting layer of an air cathode, comprising a nonwoven fibrous web impregnated with a mixture of carbon particles and a nonfibrous polymeric substance for holding the carbon particles in the web. Again, in currently preferred embodiments, the web is a web of conductive carbon fibers.

In a further aspect, the invention contemplates the provision of a method of making a sheetlike laminated air cathode, including the steps of impregnating a nonwoven fibrous web with a suspension, in a liquid vehicle, of material comprising carbon particles and a nonfibrous polymeric substance for holding the carbon particles in the web; and laminating the first and second layers together by juxtaposing them with a heat seat coating distributed between their facing major surfaces in such manner as to provide an array or network of coating-free areas extending substantially uniformly thereover, and heating the juxtaposed layers to activate the coating.

The air cathodes of the invention are characterized by highly satisfactory performance in metal/air batteries, as well as having other uses, e.g. in fuel cells. Particular advantages of the invention reside in the ease and low cost with which the laminated air cathode can be produced in large commercial-scale operations (viz. by impregnation of the nonwoven web, and subsequent lamination using a heat seal coating interspersed with coating-free spaces), as contrasted with air cathodes made by methods heretofore employed.

Further features and advantages of the invention will be apparent from the detailed description hereinbelow set forth, together with the accompanying drawings.

BRIEF DESCRIPTION OF THE DRAWINGS

FIG. 1 is a simplified schematic elevational sectional view of a metal-air battery incorporating an illustrative embodiment of the air cathode of the present invention;

FIG. 2 is a fragmentary exploded perspective view of the air cathode of FIG. 1;

FIG. 3 is a view similar to FIG. 2 of another embodiment of the air cathode of the invention;

FIG. 4 is a fragmentary sectional elevational view of a further embodiment of the air cathode of the present invention;

FIG. 5 is a view similar to FIG. 4 of yet another embodiment of the air cathode of the invention; and FIG. 6 is a view similar to FIG. 4 of a still further embodiment of the invention.

DETAILED DESCRIPTION

Referring first to FIG. 1, there is shown a metal/air battery 10 which includes a housing 11 defining a chamber 12 adapted to be substantially filled with a body of a liquid electrolyte 14 such as (for example) an aqueous solution of sodium chloride. A sheetlike air cathode 16 having opposed parallel major surfaces respectively designated 17 and 18 is mounted in one wall of the housing 11 so that the cathode major surface 17 is exposed to and in contact with the contained body of electrolyte 14, while the other cathode major surface 18 is exposed to the ambient air outside the chamber. As will be understood, the housing 11 defines a large vertical aperture across which the air cathode extends, with the periphery of the cathode sealed to the periphery of the housing aperture in a liquid-tight manner.

A metal (e.g. aluminum) anode 20, shown as mounted in a lid 22 of the housing 11, and having the form of a plate with opposed parallel major surfaces, extends downwardly into the body of electrolyte 14 in the chamber 12. The anode 20 is disposed with one of its major surfaces in parallel, proximate but spaced relation to the major surface 17 of the air cathode 16 such that there is a small electrolyte-filled gap 24 between the anode and cathode.

The general arrangement of this air battery may for example be substantially the same as that of one of the cells of the plural-cell battery described in U.S. Pat. No. 4,626,482, the disclosure of which is incorporated herein by this reference. External electrical contacts respectively designated 26 and 28 are provided for the cathode and anode of the battery which may thus be connected in an electrical circuit 29, e.g. including a switch 30 and a light bulb 32, either alone or in series with one or more other like cells. When the metal-air battery is assembled as shown, filled with electrolyte 14, and connected in the circuit 29 (with the switch 30 closed), the battery produces electricity for energizing and lighting the bulb 32, in known manner.

As best seen in FIG. 2, the air cathode 16 of FIG. 1 is a laminate constituted of a carbon-containing layer 34, a layer of metal mesh 36, and a layer 38 constituted of a film or web which is permeable to air but impermeable to water of the electrolyte 14, so that the electrolyte cannot weep or bleed through the air cathode to the exterior of the battery. This layer 38 may, for example, be a water-repellent film or nonwoven web of polypropylene or polyethylene, e.g. of a currently commercially available type. The metal mesh layer 36, which is the current-collecting means of the air cathode of FIGS. 1 and 2, may conveniently be a layer of nickel mesh (formed, for instance, by an expanded-metal technique) substantially coextensive with the layers 34 and 38 but having an exposed tab portion projecting upwardly above the latter layers to serve as the cathode contact 26.

In accordance with the invention and as a particular feature thereof, in the embodiment illustrated in FIGS. 1 and 2, the layer 34 comprises a nonwoven fibrous web impregnated with a mixture of carbon particles and a nonfibrous polymeric substance for holding the carbon particles in the web. Other substances may optionally be included in the impregnating material as well. The fibers of the web may, for example, be polyester fibers, suitable nonwoven webs of such fibers being currently commercially available. Alternatively, cellulosic fibers, polyvinyl alcohol fibers, or mixtures of two or more of the foregoing types of fibers may be used. As still another alternative, constituting in itself a further particular feature of the invention, the fibers of the nonwoven web may be electrically conductive carbon fibers, such being found especially effective.

Additional important features of the invention reside in the manner in which the layers of the air cathode 16 are bonded or laminated together. In the embodiment of FIGS. 1 and 2, the metal mesh layer 36 is sandwiched between facing major surfaces of the layers 34 and 38, and in this embodiment, the layers are bonded together by means of a discontinuous heat-seal coating initially applied to that surface of the layer 38 which faces the layers 34 and 36. More particularly, the heat seal coating is applied to the last-mentioned major surface of the layer 38 in a pattern of discontinuous dots 40, such that there is a continuous network of coating-free spaces between adjacent dots. It is found that when the layers 34 and 36 and the layer 38 bearing the dots 40 are juxtaposed and subjected to bonding heat and pressure, the dot coating adheres the layer 38 both to the metal mesh 36 and to the layer 34 (through apertures of the mesh). At the same time, owing to the discontinuous pattern of the heat-seal coating, the passage of oxygen through and beyond the layer 38 is not prevented by the resultant bond. That is to say, the layer 38 retains its porosity because the heat seal coating in the illustrated dot pattern leaves a large proportion of the pores of layer 38 unclogged.

An alternative embodiment of the cathode is illustrated in FIG. 3. Again, the cathode is made up of layers 34, 36 and 38 all as described above. In FIG. 3, however, the heat-seal coating used to laminate the layers is not applied in a dot pattern on a surface of the layer 38, but is instead interposed, as a net or mesh 42 of heat seal resin, between the layers 38 and 36. When the layers are assembled and subjected to bonding heat and pressure, the resin of the net 42 bonds layers 38 and 34 through the apertures of metal mesh 36, and the interstices of the net 42 provide an array of uncoated areas (i.e. areas of unclogged pores) extending entirely over the layer 38.

In some instances, with a structure as generally illustrated in FIG. 3, it may be desirable to employ a second layer (not shown) of the heat-seal resin net 42, the second layer being interposed between the metal mesh 36 and the carbon-containing layer 34. Again, the interstices of the two net layers leave a sufficient area of unclogged (sealant-free) pores to enable effective functioning of the cathode.

Where the nonwoven fibers of the web of layer 34 are electrically conductive, such as carbon fibers e.g. having a cladding of nickel, it may be possible to dispense with at least most of the current-collecting metal mesh layer 36. Thus, as shown in FIG. 4, in such case the layer 38 may be directly bonded to a carbon-impregnated layer 34a incorporating the conductive-fiber web (once more employing, for example, a dot pattern or net of heat seal resin to effect the bonding) with a small piece 36a of nickel or other conductive metal mesh interposed between, and bonded to, a small area of the facing surfaces of layers 34a and 38. A portion of the mesh piece 36a projects as a tab beyond the layers 34 and 38a to serve as a contact 26a for the cathode.

FIG. 5 illustrates an embodiment of the cathode of the invention wherein the facing major surfaces of the layers 34 and 38 are bonded directly together (by a dot pattern or net of heat-seal coating) throughout their extent, and the metal mesh current collector 36b is bonded to the exposed surface of layer 34 (i.e. at the cathode surface exposed to the electrolyte), with an upwardly projecting tab exposed to serve as the cathode contact 26b. In this instance, the layer 34 need not incorporate a conductive-fiber web, the current collector mesh being substantially coextensive with the layers 34 and 38. The embodiment of FIG. 5 affords superior strength of lamination, in that the layers 34 and 38 are adhered directly to each other rather than (as in FIGS. 1–3) through a metal mesh layer. The metal mesh may be bonded to the layer 34 with latex, the latex being precoated on the metal mesh.

FIG. 6 illustrates a currently particularly preferred embodiment of the cathode of the invention, in which the metal mesh 36c is sandwiched between (and substantially coextensive with) two layers 34a and 34a' each constituted of a conductive carbon fiber nonwoven web impregnated with carbon and an adhesive polymer such as Teflon, and the air-side (water-impermeable) layer 38 is laminated to the layer 34a. Bonding of layer 38 to layer 34a is effected in the same manner as described above for the embodiment of FIG. 5, and the mesh 36c is adhered to both layers 34a and 34a' with latex precoated on the mesh, again as described above with reference to FIG. 5. As before, a protruding tab portion of the mesh serves as the electrical contact 26c for the cathode.

The method of fabricating the described air cathodes of the invention may now be readily explained. To produce the carbon-impregnated web material for layer 34 or 34a, a suitable nonwoven web is impregnated (e.g. immersed in or painted or otherwise coated with) an aqueous suspension of carbon particles, the aforementioned nonfibrous polymeric substances, and other ingredients as may be desired, for example a catalyst as is commonly employed in the carbon-containing layer of an air cathode. When the web has been thus impregnated and dried, it (now constituting layer 34 or 34a) and the material for layers 36 (or 36a or 36b) and 38 are juxtaposed in the arrangement shown in FIG. 2, 3, 4 or 5, with a heat seal coating either applied as a dot pattern on the inner major surface of layer 38 or interposed as one or more layers of heat-seal net 42 at the appropriate location or locations in the "sandwich" of layers, and the sandwich is subjected to bonding heat and pressure sufficient to activate the coating to form the bond. As further discussed below, the materials of the cathode are so selected that the temperature required to activate the heat-seal coating to bond the layers does not damage the other layers or their constituent substances. Once the layers are bonded, the laminate is cut to size to provide individual cathodes.

In this manner, the invention provides highly satisfactory air cathodes at substantially reduced cost (as compared to present-day commercially available air cathodes), not only because the materials used are relatively inexpensive, but also because the manufacturing operations involved (impregnation and lamination with heat) are simple, straightforward, and readily capable of performance on a large production scale.

There follows a further more detailed description of particular embodiments of the product and method of the invention, specifying materials and process conditions therefor.

I. PREPARATION OF AIR-CATHODE ACTIVE LAYERS BY IMPREGNATING NONWOVENS

Herein are described the provision of active (carbon-containing) layers in accordance with the invention, viz. layers 34 or 34a in the illustrated embodiments, for air cathodes suitable for use in fuel cells or as cathodes in metal/air batteries. In a broader sense, the products and techniques herein described may be employed to supply thin layers of chemicals for other uses in batteries as well, including electrode applications where air is not involved.

As explained above, there are typically three components in an air cathode embodying the invention: a carbon-containing layer which consists of a nonwoven web or fabric material impregnated with a carbon-polymer mixture; a current-collector layer containing strands of metal or metal-containing conductive material; and a water-repellent, air-permeable membrane material. Factors to be considered in preparing the carbon-containing layer include selection of the nonwoven web material, formulation of the carbon-polymer impregnating mixture, and determination of process steps and conditions for producing the impregnated product.

In selecting the nonwoven material, the primary variables are chemical composition, thickness (or basis weight) and porosity (or void fraction). Pertinent to the choice of these variables are such conditions as the temperatures employed in process steps (e.g. curing and laminating) to which the carbon-containing layer is subjected, and the impregnation of the web. As further discussed below, the impregnation step involves dipping the nonwoven web into an aqueous suspension of carbon-polymer mixture, followed by scraping or wiping off the excess suspension and drying the impregnated web. To produce the impregnated web, the carbon/polymer dispersion is usually or preferably applied to both sides of the nonwoven. The porosity of the nonwoven should be sufficient to permit intermingling of the two impregnating applications of carbon/polymer, i.e. those respectively applied to the opposite sides of the web. The impregnated web may receive additional heat-curing and/or mechanical smoothing or compacting treatments, such as heat-calendering.

Especially useful, for many applications, are "polyester" nonwoven webs. These webs are made from fibers of polyethylene terephthalate (PET), which are quite inert in the use environment. PET has a melting point in the range of 245° to 265° C., and can therefore withstand the curing and heat-lamination steps employed in making the present cathode, these steps being performed at lower temperatures. Satisfactory polyester nonwovens include the grades commercially available under the trade names Reemay 2024, Reemay 2415, Confil, and Hollytex 3234. Unsatisfactory results have been obtained with the grades of polyester nonwovens commercially available under the trade names Hollytex 3329 and Hollytex 3396, which are thicker and less porous than the grades found satisfactory.

There are two tests which are helpful in selecting the nonwoven for impregnation. One is an air permeability test and the other is the front-to-back (F/B) electrical conductivity of the sheet after it is impregnated with the carbon/polymer and after it is dried.

The nonwoven must have a high void volume, to permit a high pickup of the impregnating suspension and on the pore volume of the nonwoven.

Among preferred nonwoven web materials are:

(a) Reemay 2024, a PET nonwoven made by E. I. duPont de Nemours (hereafter "duPont"), of Wilmington, Del. It has a basis weight of 71 GSM, a thickness of 11.5 mils, and a calculated void volume of about 83%. The F/B resistance after impregnation is typically about 5 to 10 ohms. Impregnation with a carbon/adhesive polymer mixture in accordance with the invention increases the basis weight from 71 to about 116 GSM, thereby giving a web with total composition of roughly 61% polyester fiber, 30% carbon and 9% adhesive polymer (usually Teflon, as discussed below) by weight.

(b) Confil, a wet-laid PET nonwoven made by International Paper Company, of New York, N.Y. It has a basis weight of about 90 grams per square meter, a thickness of 17 mils, and a calculated void volume of 85%. The F/B resistance after impregnation is typically about 5 ohms. The impregnation with carbon/adhesive polymer mixture in accordance with the invention increases the basis weight from 60 GSM to about 120 GSM, thereby giving a web with total composition of roughly 50% polyester fiber, 39% carbon and 11% adhesive polymer, plus additional void regions.

(c) A conductive nonwoven ("IPN") sold by International Paper Company under the name of Product 8000251. This and other conductive nonwoven web materials are separately discussed below.

Table I below summarizes information on various nonwovens suitable for impregnation. All of these materials are made from fibers which have melting points significantly higher than the subsequent lamination temperatures.

TABLE I

SUITABILITY OF NONWOVENS FOR IMPREGNATION

| | Nonwoven | Chemical Type | Weight GSM | Thickns Mils | Frazier Air Perm | F/B Ohms | F/F Ohms | GSM Add-on Weight | Sample No. | Cathode Performance |
|---|---|---|---|---|---|---|---|---|---|---|
| 1 | Reemay 2024 | Polyester | 68 | 12 | 350 | 14 | 4890 | 17 | 173-1 | Good |
| 2 | Reemay 2415 | Polyester | 53 | 11 | 700 | 2.3 | 1067 | 34 | 173-2 | Good |
| 3 | Reemay 2214 | Polyester | 34 | 8 | 650 | 1.8 | 3810 | 23 | 173-3 | Good |
| 4 | Reemay 2014 | Polyester | 32 | 7 | 800 | 5 | 5520 | 16 | 173-4 | Good |
| 5 | Lutrabond 3145 | Polyamide | 40 | 7 | | 1.4 | 3250 | 13 | 173-5 | Good |
| 6 | Confil | Polyester | 91 | 17 | <400 | 7.6 | 1784 | 49 | 173-6 | Good |
| 7 | Hollytex 3234 | Polyester | 46 | 5 | 160 | 4.4 | 5887 | 9 | 173-7 | Good |
| 8 | Lutrasil LSVP 665 | Polypropylene | 53 | 14 | | 2.4 | 5410 | 46 | 173-8 | Good |
| 9 | Hollytex 3329 | Polyester | 98 | | 8 | 48 | | | 1488 | Poor |
| 10 | Hollytex 3396 | Polyester | 203 | | .2 | | | | | Poor |
| 11 | IPN | Conductive | 34 | | | .4 | | 81 | 155F | Good |

Weight: basis weight of sheet before impregnation, in GSM (grams per square meter)
Frazier air perm: is a measure of air flow, in CFM per sq foot at pressure of 0.5" water.
Resistance: is the resistance (front to back) through the impregnated sheet, in ohms.
Add-on: is the weight of carbon-polymer solids added to the sheet per unit area, (GSM).
Cathode performance is a general rating, based on performance in an aluminum-air cell.
Reemay was a tradename of Dupont, they have now sold it to Reemay Corp.
Confil is a tradename of International Paper Company
Hollytex is a tradename of Filtration Sciences Corporation.
Lutrabond and Lutrasil are tradenames of Lutravil Company, of Durham, NC.
H & V refers to products of Hollingsworth & Vose, of East Walpole, MA.
IPN is our informal name for International Paper Company Product No. 8000251.

The impregnating suspension must penetrate into the nonwoven from each surface so as to achieve good intermingling between the top and bottom coatings, and to give a low front-to-back (F/B) electrical resistance. A properly porous nonwoven typically gives a front-to-back electrical resistance (after impregnation and drying) of 3 to 6 ohms. If there is inadequate penetration of the carbon suspension, the F/B resistance can be 8 to 50 ohms or higher. The impregnation treatment increases the basis weight of the sheet by 15 to 60 grams per square meter (GSM), depending on the solids content of The carbon suspension is the liquid material used to impregnate the nonwoven. The primary ingredients in the carbon suspension are (1) carbon black, (2) a nonfibrous adhesive polymer to hold the carbon black in the web, (3) dispersing agents to permit preparation of the suspension, and (4) flow control agents which impart viscosity stability and fluidity.

One example of a satisfactory and currently preferred carbon black is that available under the trade name Black Pearls-2000, a product of Cabot Corporation of Boston, Mass.

A currently preferred nonfibrous polymeric substance for use as the adhesive polymer is the grade of polytetrafluoroethylene commercially available under the trade name Teflon T-30, a product of duPont. It is purchased as a 60% solids suspension in water, containing its own dispersing agents. Cathodes of moderately good performance have also been made with a copolymer of polyvinyl chloride (PVC) used as the adhesive polymer. The PVC has advantages over the Teflon polymer (better adhesive strength which then requires less adhesive thereby raising the carbon percentage in the carbon-containing layer), but the cathode performance to date has been inferior. Teflon T-20 polymer of duPont is a suitable substitute for the Teflon T-30 polymer. Teflon 30B of duPont is believed also suitable, although preliminary testing of this material did not achieve satisfactory results.

The dispersing agents are in the carbon dispersion and in the Teflon dispersion. Tests reported herein have used custom-dispersed carbon; the dispersing agent is calcium naphthenate. The dispersed carbon used is designated "Foamblak 991." The Teflon dispersion is understood to be dispersed with a nonionic dispersant available from Rohm & Haas under the trade name Triton X-100. Flow modifiers, discussed below, may also have dispersing agent properties.

Flow modifiers have seldom been used in the tests and samples herein described, but have potential importance in overcoming a problem encountered in mixing the Teflon polymer and the carbon, viz. the tendency of such mixture to gradually gel upon standing, resulting in a material which has poor properties for impregnation. It is found that a few percent of sodium carboxymethyl cellulose (CMC) added to the carbon will prevent much of the gelling which occurs upon the addition of the Teflon polymer to the carbon.

Platinum-catalyzed carbons have also been used with beneficial effects. These were prepared by precipitating platinum in samples of the aforementioned Foamblak 991 dispersion, using a proportion of platinum equal to 2% of the weight of carbon present.

In tests herein reported, impregnation has been performed by hand, painting the suspension onto both sides of the nonwoven web with a paint brush. However, for commercial-scale production the impregnation step can be performed on a continuous web machine.

In some tests of the present invention, a curing step has been performed on the impregnated nonwoven web to assist the Teflon polymer to bond the carbon, although its effect is uncertain. It is understood that the Triton X-100 dispersant evaporates at 150° C. The curing step is performed for 3 minutes at 150° C. in a Carver press at near-zero platen pressure.

The carbon-containing layer described above has value in an air cathode when it is attached to a conductive current collector (layer 36 or 36b or 36c in FIGS. 1-3, 5 and 6). The current collector is nickel mesh (believed at present to be most satisfactory) or any other metal mesh which will not be corroded in the use environment. Air cathodes also need an air-permeable, water-repellent layer in the laminate. The air-permeable layer will be described separately below.

Alternative useful nonwoven web materials for the carbon-containing layer 34 of the air cathode of the invention include easily wettable, hydrophilic, cellulosic (or other absorptive) nonwovens impregnated with carbon/adhesive (usually carbon/Teflon). In contrast, the polyester webs discussed above and other (e.g., polyolefin and polyamide) nonwoven substrates are not absorptive, although they could be made very wettable with treatment with wetting agents; it is not known at present if such wetting agents would interfere with the cathode's functional performance.

Examples of absorptive nonwoven web materials that have been tested (being impregnated in the manner described above for PET nonwovens, and evaluated in use in or as the nonwoven web of layer 34 in an air cathode arranged in accordance with the invention) are the following products of the Chicopee Division of Johnson & Johnson, at least two of which are currently used in absorptive medical pads, all hereinbelow identified by trade name or grade designation and described with reference to the aforementioned tests:

(d) Code 5710. The fibers of the web are 70% Rayon (regenerated cellulose) and 30% polyester (polyethylene terephthalate); the web also contains 2% extra binder (acrylic resin) to hold the web together. As tested, the basis weight was 78 GSM before impregnation and 147 GSM after impregnation, giving an add-on of 69 GSM. Electrical performance (sample 184A in Table II below) was good. This material has potential as a preferred nonwoven web for impregnation and inclusion in cube-cell cathodes.

(e) Code 5524. The fibers are 60% wood pulp and 40% polyester (polyethylene terephthalate); the web is not acrylic-bonded. Basis weight was 70 GSM before impregnation and 114 GSM after impregnation, giving an add-on of 34 GSM. Electrical performance (sample 184B in Table II) was fairly good for the first 24 hours of testing, but thereafter the test cathode showed evidence of delamination. This sheet could be satisfactory for air cathode use if it were treated with a water-resistant binder resin.

(f) Code 9676-7519. The fibers are 30% Rayon (regenerated cellulose) and 70% polyvinyl alcohol. Basis weight was 42 GSM before impregnation and 65 GSM after impregnation, giving an add-on of 23 GSM. Electrical performance (sample 184C in Table II) was good, but inferior to that of the Code 5710 and Code 5524 materials.

(g) Code 9657-7814. The fibers are 100% polyvinyl alcohol. Basis weight was 67 GSM before impregnation and 83 GSM after impregnation, giving an add-on of 15 GSM. This sheet was not sufficiently porous to pick up the amount of carbon/polymer which must be picked up during impregnation to give good cathode performance. Electrical performance was poor (sample 184D in Table II). Although this sheet was too compact, it is expected that other polyvinyl alcohol sheets would be acceptable.

The absorptive nonwovens just mentioned are well suited to processing on a production machine for making a carbon-impregnated air cathode layer, and in this regard they are much superior to the non-absorptive nonwovens.

The wood pulp (Code 5524) was inferior, but it is expected that a sheet of 60% to 80% (and maybe 100%) wood pulp could be made acceptable by treatment with wet-strength resin.

The polyvinyl alcohol fibrous nonwoven can be used as an impregnating base. This type of nonwoven is used in the alkaline battery industry. A primary attribute of polyvinyl alcohol is its resistance to alkali, an attribute that may be advantageous in specialized applications.

In testing the absorptive materials, as reported in Table II below, a controlled-current half-cell (CCHC) test was used to indicate the performance of the cathode independent from the anode. The best results are those closest to zero.

The cube cell voltage in Table II shows the output of the cell under continuous load for 20 hours. It is a type of life test, measuring performance of both anode and cathode. Cube cell tests are erratic after about 8 hours because of scale buildup in the cell. The best results are the highest voltages.

The second CCHC test shows cathode performance after the cathode has been run for 24 hours in a cube cell test. Data show that samples 184A and 184B were superior to 184C and 184D. For many applications the current density will be less than 5mA/cm$^2$. Most testing is done at higher current densities to accelerate the test and to magnify differences.

TABLE II

| | Nonwoven | Composition | Orig GSM | Add-on GSM | Resis F/B ohms | Resis F/F ohms | Feel |
|---|---|---|---|---|---|---|---|
| 184A | 5710 | 70Ray-30PET | 78 | 69 | 2 | 324 | V. Soft |
| 184B | 5524 | 60WP-40PET | 70 | 34 | 5 | 820 | Soft |
| 184C | 9676-7519 | 70PvOH-30Ray | 42 | 23 | 6 | 714 | Med |
| 184D | 9657-7814 | 100 PvOH | 67 | 16 | 15 | 1160 | Stiffer |

CUBE CELL V - 10 mA/cm 2

| Cathode | 4 hr | 8 hr | 12 hr | 16 hr | 20 hr |
|---|---|---|---|---|---|
| 184A | .92 | .91 | .90 | .85 | .87 |
| 184B | .91 | .88 | .85 | .79 | .78 |
| 184C | .91 | .88 | .79 | .73 | .57 |
| 184D | .71 | .67 | .65 | .52 | .59 |

CCHC - HALF-CELL VOLTAGES at indicated current per sq. cm.

| Cathode | 1 mA | 5 mA | 10 mA | 20 mA | 40 mA | 80 mA |
|---|---|---|---|---|---|---|
| 184A | −.07 | −.10 | −.14 | −.17 | −.22 | −.31 |
| 184B | −.11 | −.16 | −.19 | −.25 | −.37 | −.57 |
| 184C | −.10 | −.16 | −.22 | −.30 | −.43 | −.71 |
| 184D | −.17 | −.23 | −.28 | −.37 | −.54 | −.83 |

CCHC - HALF-CELL VOLTAGES after 20 hr cube cell test

| Cathode | 1 mA | 5 mA | 10 mA | 20 mA | 40 mA | 80 mA | 10 mA |
|---|---|---|---|---|---|---|---|
| 184A | −.10 | −.15 | −.24 | −.35 | −.56 | −.93 | −.27 |
| 184B | −.09 | −.15 | −.23 | −.34 | −.54 | −.91 | −.28 |
| 184C | −.14 | −.22 | −.30 | −.37 | −.57 | −.86 | −.30 |
| 184D | −.16 | −.31 | −.58 | −.89 | −1.40 | −1.93 | −.93 |

Data show that the materials of samples 184A, 184B and 184C are acceptable. The higher carbon add-on with 184A is an indication that it may be superior, among those tested in this group.

Conductive-fiber nonwoven webs (also separately discussed below) may alternatively be employed. These are materials made of carbon fibers with or without a coating (on the fibers) of metallic nickel. Such webs, with nickel-coated fibers, may be capable of use in place of nickel mesh as current collectors, although samples thus far tested appear insufficiently effective for such use. With or without the nickel coating, however, they provide startlingly good results when used as the nonwoven which is impregnated with the carbon-Teflon polymer suspension to provide the carbon-containing layer (34a, FIGS. 4 and 6) of an air cathode. In some instances, with the conductive nonwovens it is possible to combine the active (carbon-containing) layer function and the current collector function into one thin layer; consequently, it is to be understood that the foregoing discussion of air cathodes utilizing a metal mesh layer as current-collecting means is subject to exceptions which relate to the products made with active layers incorporating conductive nonwoven webs.

II. AIR-SIDE LAYER OF AIR CATHODES

The air-side layer 38 of the air cathode of the invention requires a combination of air-permeability and water-repellency. If the air-side layer imbibes liquid in its pores, the passage of air may be restricted, and undesirable leakage or weeping of electrolyte liquid through the air-side layer may occur.

The air-side layer can be omitted from some types of air cathodes if the liquid-side (carbon-containing) layer has appropriate properties, although initial attempts to produce such cathodes have exhibited leakage of electrolyte through to the air side. Some prior proposals for provision of air-side layers have involved use of Teflon-carbon mixtures in which the Teflon content is lower than in the liquid side; but applicant's attempts to make such structures have produced erratic results.

Illustrative examples of products found suitable for use as the air-side layer in cathodes of the present invention include two polypropylene films (respectively available under the trade names Celgard and Gelman), and a fibrous polyethylene nonwoven web commercially available from duPont under the trade name Tyvek. Polyester nonwovens tested as air-side materials have given invariably bad results.

"Celgard" is the trade name of a family of porous polypropylene films made by Celanese Separations Products of Charlotte, N.C. Celgard 2400 and Celgard 4410, which is a laminate of Celgard 2400 and a nonwoven polypropylene web, have been tested. Celgard 2400 is a hydrophobic film of 1 ml nominal thickness, a porosity of 38% and a resistance to air flow of 35 Gurley seconds. Celgard 4410 is currently preferred because it is thicker, tougher, and easier to use. In initial tests, Celgard 4410 was adhered to the nickel mesh by first painting an adhesive on the nickel mesh. Subsequently, a polyethylene mesh commercially available from Conwed Plastics of Minneapolis, Minn., under the trade name CLAF 5001 net-style adhesive (net 42 in FIG. 3) has been used to bond the Celgard 4410 to the nickel mesh. This adhesive works well at a laminating (bonding) temperature of 140° to 150° C.

"Gelman" is the trade name of a microporous membrane (developed as a bacteria filter) sold by Gelman Sciences, of Ann Arbor, Mich. It serves very satisfactorily as an air-side layer (although it is relatively expensive) in that it passes the air but repels the electrolyte solution. When the Gelman membrane is used as the air-side layer 38 of the air cathode, the aforementioned CLAF heat-seal resin net 42 is again employed to bond the cathode layers together.

At least for a variety of applications, a currently preferred material for the air-side layer 38 is a Tyvek web, a product made from the partial compaction of a nonwoven fibrous material. There are many different grades of Tyvek, and most of them are surface-treated (usually oxidized) to make them more receptive to inks and less water-repellent. The Tyvek grade currently preferred for air cathodes of the present invention is grade 1073B, which is used in packaging of gas-sterilizable hospital supplies. It has no anti-static treatment and no corona treatment. It withstands a static head of 60 inches of water and the resistance to air flow is 21 Gurley seconds. A similar but less preferred Tyvek grade (though also believed satisfactory) is 1059B which has like properties but lower basis weight than 1073B.

In order to use the Tyvek material, which has melting point of about 130° C. and a still lower softening point, it must be adhered to the nickel mesh 36 and/or layer 34 at temperatures which do not compact and ruin the porosity of the Tyvek. Also, any heat-seal adhesives should not plug the porosity of the Tyvek.

Several converters offer Tyvek 1073B with a discontinuous heat-seal coating on one side. A preferred form of Tyvek 1073B with a discontinuous heat-seal coating is supplied by Oliver Products Company, of Grand Rapids, Mich. This product has the heat-seal adhesive applied in the form of discontinuous dots (viz., as a dot pattern 40, referred to above with reference to FIG. 2). The adhesive is applied to the Tyvek as a hot melt; owing to process limitations of the supplier, the strongest adhesives (of which that designated "adhesive 18" is currently preferred for present purposes) are applied only to the 1073B and not to the 1059B. A competitive product from another supplier was found to give inferior results. Although these heat-seal coatings, even if discontinuous, must retard the passage of air through the sheet to some extent, it has been confirmed by experimentation that the dot-pattern heat-seal coated Tyvek 1073B still has more than enough passage of air for use as the air-side layer of an air cathode. The Oliver Products heat-seal coated Tyvek 1073B with dot application of their adhesive 18 will be referred to hereafter as "OLA."

The cathode-laminating operation with OLA is simple. The carbon-containing layer, the nickel mesh, and the OLA are juxtaposed as a "sandwich" and subjected to heat and pressure. Good results are obtained at 100° to 110° C., a pressure of 100 p.s.i. and a dwell time of 1 minute. It is expected that the dwell time may be reduced to a fraction of a second by heating the webs up to temperature before pressure is applied.

An advantage of OLA for air cathodes is that it is a high-specification material currently mass-produced for the medical supplies industry and, as such, is available at a substantially lower price than the other air-side materials herein specifically considered. Furthermore, the products made with OLA have superior ply adhesion, holding air cathode laminates together satisfactorily under conditions of use, whereas competitive products present delamination problems under extended battery use. Finally, OLA is very tough and durable, reducing the likelihood of accidental puncture in fabrication or in use, as compared (for example) with Celgard products, which are much weaker. The OLA is equally valuable in combination with conductive nonwovens where the metal mesh current collector can be omitted, and/or in other air cathodes wherein the air-side and carbon-containing layers are directly bonded with no intervening metal mesh, as in the embodiments of FIGS. 5 and 6.

Problems have nevertheless been encountered in use of OLA, in that there is leakage of electrolyte through the fiber structure, particularly on long-duration tests (2 to 5 weeks) at temperatures of about 110° F., although to some extent this difficulty may be attributable to factors such as puncturing of the OLA layer by burrs on the nickel mesh layer 36. OLA may therefore be preferred for use in lower-priced cells, for the educational and gadget markets, but a porous Teflon film (discussed below) may be preferred for the air-side layer 38 for other applications, e.g. on the air side of barge-light cell cathodes.

This porous Teflon film is a product (designated "125/4") of Fluorglas of Hoosick Falls, N.Y. It is a 4-mil Teflon film which has sufficient porosity to reduce the density to about 1.50, giving give a pore volume in the range of 30 to 33 percent. A CLAF resin net 42 is used to attach the Teflon film layer 38 to the metal mesh layer 36, forming the combination: carbon-Teflon-impregnated nonwoven web layer 34 / CLAF net 42 / nickel mesh layer 36 / CLAF net 42 / Teflon film layer 38.

III. ELECTRICALLY CONDUCTIVE NONWOVENS IN BATTERY ELECTRODES

As stated, an electrically conductive carbon fiber nonwoven web impregnated with carbon and a nonfibrous polymeric substance (e.g. Teflon polymer) as an adhesive may be employed as the layer 34 or 34a in the air cathode of the invention. Such a layer may also have utility in battery applications other than air-cathode applications.

It is known to apply active carbon material onto a wire conductor. There are commercial air-cathodes which apply a carbon-Teflon mixture directly to wire mesh.

One conductive carbon fiber nonwoven web herein considered is a product of International Paper Company having the trade name or grade designation Product 80000251 (hereinafter termed IPN). This web is made of carbon fibers coated with nickel and formed into a wet-laid nonwoven web on an experimental paper machine. The product is available in about six different basis weights; work described herein has primarily employed the product weighing one ounce per square yard (about 34 GSM).

The IPN web alone is operative as a substitute for the current collector metal mesh 36 but appears too weak for effective use as the current-collecting means. Also, the IPN web alone is not effective as the carbon-containing layer of an air cathode. When it is used as the nonwoven web impregnated with carbon and Teflon polymer in the carbon-containing layer 34 or 34a, however, results are good and the cell life may be double that when the nonwoven is the aforementioned Reemay PET web. The data on life are quite variable, and also the percentage improvement depends greatly on what cutoff point is used to define "end of life." There is no doubt, however, that the conductive nonwoven, when impregnated with a carbon-adhesive suspension, provides a superior liquid-side layer.

The F/F resistance is about 0.7 ohms, compared with several thousand ohms if the nonwoven is the Reemay web, owing (as at present believed) to a decrease in the average distance from any point in the carbon layer to a conductor; i.e., by having the conductor system better distributed through the carbon layer such average distance is reduced. The result is less electrical resistance (lower IR loss) in the cell.

Indeed, it may well be that the conductive nonwoven's sole or at least primary contribution to effective performance is to decrease the average electrical resistance between (1) all the active reaction sites in the carbon layer and (2) the metal mesh current collector. As such, the IPN gives better cathode than the polyester nonwovens mentioned above.

There is one configuration (FIG. 4, discussed above) wherein the IPN can replace most of the nickel mesh. In that case, most of the air cathode has just two layers, the OLA and the IPN impregnated with carbon/adhesive. However, a thin strip of the nickel mesh is inserted so that a half inch of the strip is laminated between a portion of these two layers and some of the nickel mesh protrudes beyond the laminate to give a metal tab for electrical connections.

A number of cathodes have been made in this way, including cathodes with the IPN and the nickel mesh both throughout the entire cathode, and others with just a strip of nickel mesh (for the connection tab); the latter appear to provide superior electrical performance per unit of assembly cost.

Also useful is a carbon fiber nonwoven with no nickel or other metallic coating, one such material being International Paper Company's Product 8000030. This unplated carbon fiber nonwoven material has been found to perform essentially the same, in the cathodes of the invention, as the nickel-plated carbon fiber nonwoven.

Five different types of impregnated nonwoven webs were made and compared in "Type 24" cathodes (described below, and having the arrangement shown in FIG. 5, discussed above):

Sample 196A: International Paper Company's carbon fiber nonwoven web without nickel coating (Product 8000030), impregnated with 10% solids carbon/Teflon "dope", with an add-on of 70 GSM;

Sample 196B: The same uncoated carbon fiber web material impregnated with the carbon/Teflon dope diluted to about 7% solids, giving an add-on of 46 GSM;

Sample 196C: The same 7% dope, used to impregnate the IPN nickel-coated carbon fiber nonwoven web, with an add-on of 16 GSM;

Sample 196D: The 7% dope, used to impregnate the absorptive cellulosic web identified above as Code 5710 with an add-on of about 20 GSM;

Sample 196E: A carbon-containing layer produced with 43 GSM add-on by carbon/Teflon impregnation onto the IPN nickel-coated carbon fiber nonwoven web. Test results with these five cathodes are summarized in Table III

TABLE III

| Cathode | CCHC - HALF-CELL VOLTAGES at indicated current per sq. cm. | | | | | | | CUBE CELL V - 10 mA/cm 2 | | | | Current Density Req to give Polarization of −0.3 Volts |
|---|---|---|---|---|---|---|---|---|---|---|---|---|
| | 1 mA | 5 mA | 10 mA | 20 mA | 40 mA | 80 mA | 10 mA | 12 hr | 16 hr | 20 hr | 22 hr | |
| 196A | −.14 | −.16 | −.19 | −.22 | −.26 | −.34 | −.21 | .85 | .85 | .85 | 1.02 | 60 |
| 196B | −.14 | −.20 | −.25 | −.32 | −.45 | −.66 | −.21 | .86 | .81 | .81 | .86 | 23 |
| 196C | −.14 | −.20 | −.25 | −.32 | −.43 | −.61 | −.24 | .76 | .70 | .69 | .84 | 22 |
| 196D | −.11 | −.20 | −.27 | −.39 | −.60 | −.99 | −.30 | .50 | .44 | .46 | .33 | 10 |
| 196E | −.11 | −.14 | −.17 | −.20 | −.25 | −.38 | −.19 | .89 | .88 | .82 | .98 | 45 |

Note:
The 22-hr cube cell voltage was by voltmeter directly on electrodes.
Data show that all-carbon nonwoven (196A) is equal to nickel plated (196E), both at high add-on. At low add-on, all carbon nonwoven (196B) is equal to nickel plated (196C).
Cellulosic nonw (196D) has comparable quality OK only at current densities below about 5 mA/cm."

The all-carbon nonwoven web (with no nickel coating) is a currently preferred conductive nonwoven material for the invention. It can be made with much better formation (uniformity of fiber distribution) than the nickel-plated material, which tends to contain stalky fiber bundles. Also, the all-carbon material is 20% cheaper than the web of nickel-coated fibers.

The cathodes referred to as "Type 24" have the arrangement WA/C20/OLA, in which WA refers to the nickel mesh which has been precoated with an adhesive and C20 refers to the conductive nonwoven impregnated with a carbon/Teflon mixture. In these cathodes, as FIG. 5 illustrates, the nickel mesh is on the exposed surface of layer 34 (C20) rather than being sandwiched between layers 34 and 38.

In cathodes with conductive carbon fiber nonwoven webs in the layer 34 and with the nickel mesh on the outside, the conductive nonwoven web contributes significantly in insuring good results. Also, placing the mesh on the outside affords several advantages. First, it is easy to make outside connections to the nickel mesh. Second, it may give longer-lived cathodes because it now appears that many past failures could have been the result of delamination between the carbon layer and the porous film, and there may be reduced delamination problems if the OLA is bonded directly to the carbon-containing layer 34 rather than to a center layer of nickel mesh. A third consideration relates to avoiding leakage through the air-side layer 38: the carbon layer between the nickel mesh and the porous OLA film 38 should prevent the sharpness of the mesh from punching holes in the film.

By way of further illustration of the invention, reference may be made to the following specific hypothetical examples:

EXAMPLE I

To prepare a cathode, a carbon/polymer dispersion is made. One hundred grams of Foamblak 991 (a 15% solids dispersion of Black Pearls-2000 carbon black) are diluted with 23 grams of water. 7.1 grams of Teflon T-30 (a 60% solids dispersion) are diluted with 23 grams of water and added to the diluted carbon black, with good agitation. When the two ingredients are mixed, there is an initial thickening, which gradually smooths out with additional mixing. This mixture is reasonably stable and ready for use. It has the consistency of paint.

A nonwoven, such as Reemay 2024, is then impregnated with the carbon/polymer dispersion. Many different methods can be used. One convenient method is to apply the carbon/polymer dispersion to both sides of the nonwoven with a paint brush. The surface can be smoothed out if desired by passing the wet sheet over a levelling bar. In some cases, good results can be obtained by applying the carbon dispersion to just one side of the nonwoven.

The impregnated nonwoven web is then dried, either at ambient temperature or at elevated temperature. Hot air or hot metal drying surfaces can be used. For instance, a hot air gun can be used to accelerate the drying.

The dried sheets are cured in a Carver press, using, for example, a curing cycle of 3 minutes at 150° C. and 20 p.s.i. pressure. The curing cycle time should be at least one minute, and it can e overnight. With 3 minutes curing, the temperature should be at least in the range of 150° C. (as opposed to 100° C.), and the curing temperature can be as high as 240° C.; at the latter temperature, the polyester nonwoven starts to melt and get sticky The pressure should be kept as low as practical.

The cured sheets are next laminated, by juxtaposing the carbon-impregnated layer (CN) with a layer of wire mesh (W) and a layer of OLA in the arrangement CN/W/OLA, with the heat-seal-coated surface of the OLA layer facing the other two layers. The assembly is placed in a Carver press and subjected to 105° C. for one minute at 20 p.s.i. to effect bonding. In general, the conditions are selected to get good ply adhesion without compacting the porous materials to cause serious loss of porosity In the above case, the only adhesive is that which had been coated onto the OLA. Some of that adhesive migrates through the holes of the nickel mesh to bind onto the CN layer.

An alternate way of applying the adhesive, which is more complex but gives better ply adhesion, involves the use of dry adhesives which are inserted between the carbon-containing and air-side layers as dry, porous webs. An example of such a dry adhesive is the aforementioned CLAF net, an open mesh material of polyethylene resin (melting point about 135° C.). Conwed Plastics, of Minneapolis, Minn., markets a variety of such products with heat-sealing temperatures ranging from about 80° C. to about 180° C.

The CLAF net materials can be used between the CN and the nickel mesh, and/or between the mesh and the OLA or other air-side layer. The CLAF net is most often used when the air-side layer is porous Teflon film, Celgard, or some other porous material which does not contain its own heat-sealing coating. For example, a cathode may have the arrangement: CN/CLAF net/W/CLAF net/AS with a conductive carbon fiber nonwoven web in the CN layer and with a porous Teflon film as the air-side (AS) layer.

The laminating temperature selected is dependent on the type of adhesive used. The CLAF net requires lamination between about 125° C. and 150° C. At that temperature Tyvek (polyethylene) melts, so CLAF adhesive is normally not used if there are other polyethylene components in the cathode laminate.

As still another alternative, a laminating adhesive may be applied by painting onto the metal mesh before laminating. For instance, a layer of PVC (polyvinyl chloride copolymer resin) may be painted onto the metal mesh and dried prior to lamination. Geon 450X61 latex, so used, has been found to provide good laminates at 100° C. The only problem encountered in early tests has been difficulty in achieving a uniform coating of resin on the wire mesh, but satisfactory coating uniformity is attainable by resort to appropriate coating techniques.

After bonding is completed, the laminate is removed from the press, allowed to cool, and cut to desired cathode dimensions; it is then ready for use.

This type of cathode may be used in an aluminum-air cell which uses aluminum as the anode, usually employing a solution of sodium chloride as electrolyte. The cathodes as outlined above are also suitable for use with other electrolytes such as solutions of NaOH or KOH.

EXAMPLE II

In a "Type 24" cathode which is made with a conductive carbon fiber nonwoven web (either nickel-coated carbon or plain carbon fiber), the metal mesh layer (nickel mesh) is precoated with adhesive before the laminating step. This is a durable, long-life cathode for rugged applications. The carbon-containing layer is in the center and the metal mesh layer is on the electrolyte side of the cathode, as illustrated in FIG. 5.

The type 24 cathode will perform well at current densities of 10A/cm$^2$, and perhaps double or triple that level. Its arrangement is WA/C20/OLA, in which the C20 layer is an International Paper Company conductive carbon fiber nonwoven web (either nickel-coated fibers or uncoated fibers, having a basis weight of 1 oz./yd$^2$, i.e., 34 GSM) impregnated with carbon/Teflon, using for impregnation a coating formula (on solids basis) containing 78% carbon (Foamblak 991 at 15% solids) and 22% Teflon T-30 (bought at 60% solids), the formula to be applied at a solids content of 8.5%.

Coating operations are performed on a continuous web machine. For the C20 layer, the nonwoven is carried through the coating and drying operation on a web of polypropylene mesh. Coating is applied to the web at 50% speed (2 f.p.m.) or higher, dried at 290° to 320° F. (oven set temp). The calender is reversed to permit 180 degrees wrap around both top and bottom rolls, for extra drying. The calender rolls are run at 260° F., with nip closed at 500 to 1000 p.s.i. pressure. The polypropylene mesh is peeled off and discarded at a convenient point. Add-on is expected to be 30 to 60 GSM; the coating operation is repeated if add-on is less than 25 GSM.

The WA layer is fine nickel mesh from Delker, flattened and annealed (other meshes can be substituted) precoated with Geon Latex 460×46 adhesive (available from Goodrich Chemical Co.), applied at a solids content of 30% (made by mixing seven parts water with three parts latex by weight), coated at 100% speed (4 f.p.m.), and dried at 300° F. Add-on should be about 8 GSM and 60% or more of the mesh holes will normally have visible adhesive.

The OLA layer is as described above (Tyvek polyethylene nonwoven web with a dot pattern of heat-seal coating on one surface).

Laminating procedure is as follows:

The oven is used as a preheater, and set at 225° F. (just cool enough to avoid damage to the OLA). The laminating rolls are set for straight through operation, with the upper roll at 150° F. an the bottom roll at 190° F., and with the gap set at 4 mils (measured on hot rolls). The run pressure is 2000 p.s.i. The webs to be laminated are run through the hot oven, then through the heat tunnel (with some insulation) and then through the nips. The hot laminate is pulled straight out of the nips, with no bending until it has cooled for a period of time. The lamination speed is 100% (4 f.p.m.).

EXAMPLE III

Cathodes of the type shown in FIG. 6 (having two carbon-containing layers) are produced with the arrangement OLA/C20/WA/C20. The WA layer is made by coating expanded nickel mesh (Delker's 4Ni7-077) with Geon Latex 460×46 at a solids content of 80% (8 parts wet latex to 2 parts water). In each C20 layer, the conductive nonwoven web is preferably International Paper Company Product No. 8000034, made of carbon fibers with no nickel coating; in this respect it is similar to Product No. 8000030, referred to above, but Product No. 8000034 has a higher binder content (to provide enhanced adhesion between fibers) and has sufficient wet strength to be processed without use of the polypropylene mesh mentioned in Example II above.

Lamination is performed in a two-step operation. First, a C20/WA/C20 laminate is made by juxtaposing these three webs, advancing them through an oven, and then passing the heated juxtaposed webs through laminating rolls. In current procedure, the oven temperature is 300° F., the speed through the oven is 3 to 4 feet per minute, the laminating roll temperatures are 150° to 190° F., and the laminating pressure is 1,500 p.s.i. (about 400 pounds per lineal inch of nip width. The C20/WA/C20 web is then laminated to the OLA using the same conditions described in Example II.

EXAMPLE IV

A carbon-containing layer of the general type designated C20 in Examples II and III above is prepared, using as the conductive nonwoven web the above-described International Paper Company Product No. 8000034, which has a basis weight of about 34 GSM before lamination. Other webs could be used (International Paper carbon-fiber nonwoven webs of different grades range in basis weight from about 9 GSM to about 68 GSM); whatever basis weight is used, the ratio of ingredients in the final layer (as given below) is substantially the same.

This web is impregnated, in the manner described above, with a mixture comprising carbon and adhesive polymer. The carbon/polymer weight ratio is preferably between 70/30 and 92/8. If Teflon polymer is used, a range of 70/30 to about 85/15 is preferred, while if the adhesive is a lower-density polymer such as polyvinyl chloride the range is from 80/20 to 92/8.

Add-on from impregnation (on the 34 GSM nonwoven) is in a range of about 15 to about 100 GSM. A range of about 25 to about 80 GSM is preferred, because performance falls off below about 25 GSM, and use of more than about 80 GSM appears not to enhance product properties but increases the difficulty of producing the layer.

In a currently particularly preferred carbon-containing (C20) layer as described, with a 50 GSM add on by impregnation, the composition is: 40.5% carbon fiber (34 GSM), 13.1% Teflon polymer (11 GSM), and 46.4% nonfibrous carbon (39 GSM), all percentages herein being expressed as percentages by weight.

With Teflon polymer as the adhesive, an acceptable composition range is from 57.6% carbon fiber (34 GSM), 6.5% Teflon (3.75 GSM), and 36% nonfibrous carbon (21.25 GSM) to 29.8% carbon fiber (34 GSM), 21% Teflon (24 GSM), and 49% nonfibrous carbon (56 GSM). With polyvinyl chloride as adhesive polymer, an acceptable range is from 57.6% carbon fiber (34 GSM), 3.4% polyvinyl chloride (2 GSM), and 39% nonfibrous carbon (23 GSM) to 40.5% carbon fiber (34 GSM), 11.9% polyvinyl chloride (10 GSM), and 47.6% nonfibrous carbon (40 GSM).

Stated more broadly, the composition ranges given above define the relative weight proportions of carbon fiber, adhesive polymer, and nonfibrous carbon present in the produced carbon-containing layer. If other ingredients (e.g. a catalyst) are also present, the proportionate relationship of the carbon fiber, adhesive polymer, and nonfibrous carbon to each other remain unaltered, although of course, in such case, their combined content no longer equals 100% of the total layer weight.

It is to be understood that the invention is not limited to the features and embodiments hereinabove specifically set forth but may be carried out in other ways without departure from its spirit.

I claim:

1. An air cathode comprising a sheetlike laminate including
   (a) first and second layers having opposed major surfaces respectively exposed for contact with a liquid electrolyte and with air, said layers also having facing major surfaces, and said second layer being permeable to air but not to said liquid electrolyte; and
   (b) current-collecting means in contact with said first layer and connectable to external electrical circuitry; wherein the improvement comprises
   (c) said first layer comprising a nonwoven fibrous web impregnated with a mixture of carbon particles and a nonfibrous polymeric substance for holding the carbon particles in the web; and
   (d) said facing major surfaces of said first and second layers being bonded together by heat seal coating material distributed on said facing major surfaces in such manner as to provide an array or network of areas free of coating material extending substantially uniformly thereover.

2. An air cathode as defined in claim 1, wherein said current-collecting means comprises a layer of metal mesh.

3. An air cathode as defined in claim 2, wherein said layer of metal mesh is interposed between and is substantially coextensive in area with said first and second layers.

4. An air cathode as defined in claim 2, wherein said layer of metal mesh is bonded to the exposed surface of said first layer.

5. An air cathode as defined in claim 1, wherein said fibrous web is a nonwoven web of conductive carbon fibers.

6. An air cathode comprising a sheetlike laminate including
   (a) first and second layers having opposed major surfaces respectively exposed for contact with a liquid electrolyte and with air, said layers also having facing major surfaces, and said second layer being permeable to air but not to said liquid electrolyte; and
   (b) current-collecting means in contact with said first layer and connectable to external electrical circuitry;
   wherein the improvement comprises
   (c) said facing major surfaces of said first and second layers being bonded together by heat seal coating material distributed on said facing major surfaces in such manner as to provide an array or network of areas free of coating material extending substantially uniformly thereover.

7. An air cathode as defined in claim 6, wherein said coating material is distributed as a multiplicity of spaced-apart dots.

8. An air cathode as defined in claim 6, wherein said coating material is distributed as a mesh having coating-material-free interstices.

9. In a method of making an air cathode that comprises a sheetlike laminate including first and second layers and current-collecting means in contact with said first layer and connectable to external electrical circuitry, wherein said layers have opposed major surfaces respectively exposed for contact with a liquid electrolyte and with air, said layers also having facing major surfaces, and said second layer being permeable to air but not to said liquid electrolyte;
the steps of
   (a) impregnating a nonwoven fibrous web with a suspension, in a liquid vehicle, of material comprising carbon particles and a nonfibrous polymeric substance for holding the carbon particles in the web, and
   (b) laminating said first and second layers together by juxtaposing them with a heat seat coating distributed between their facing major surfaces in such manner as to provide an array or network of coating-free areas extending substantially uniformly thereover, and heating the juxtaposed layers to activate the coating.

* * * * *